United States Patent [15] 3,682,997
Tesoro et al. [45] Aug. 8, 1972

[54] SODIUMTHIOSULFATOETHYL KETONES AND THEIR USE AS POLYMER MODIFIERS

[72] Inventors: Giuliana C. Tesoro, 278 Clinton Avenue, Dobbs Ferry, N.Y. 10522; Stephen B. Sello, 43 Reservoir Place, Cedar Grove, N.J. 07009

[22] Filed: Jan. 29, 1970

[21] Appl. No.: 12,533

Related U.S. Application Data

[60] Division of Ser. No. 650,148, May 11, 1967, Pat. No. 3,506,676, which is a division of Ser. No. 455,333, May 12, 1965, Pat. No. 3,338,883, which is a continuation-in-part of Ser. No. 99,673, March 31, 1961, abandoned, and a continuation-in-part of Ser. No. 404,525, Oct. 16, 1964, abandoned.

[52] U.S. Cl. .................................................260/453 R
[51] Int. Cl. ............................................C07c 143/00
[58] Field of Search ..............260/453 R, 593, 607 A

[56] References Cited

UNITED STATES PATENTS

| | | |
|---|---|---|
| 2,897,223 | 7/1959 | Gaertner....................260/453 |
| 2,934,552 | 4/1960 | Gaertner....................260/453 |
| 3,153,077 | 10/1964 | Tesoro.......................260/453 |
| 3,035,041 | 5/1962 | Schnyzer et al........260/607 A |
| 3,336,391 | 8/1967 | Lyness et al. ..........260/607 A |
| 1,835,394 | 12/1931 | Hentrich et al. .......260/607 A |
| 3,316,227 | 4/1967 | Gerber.....................260/607 A |
| 3,359,061 | 12/1967 | Welch......................260/607 A |
| 3,388,118 | 6/1968 | Tesoro.......................260/212 |

*Primary Examiner*—Lewis Gotts
*Assistant Examiner*—G. Hollrah
*Attorney*—Kenyon & Kenyon Reilly Carr & Chapin

[57] ABSTRACT

Bis [2-(sodium thiosulfato)ethyl] ketone, 2-(methoxy)ethyl 2-(sodium thiosulfato)ethyl ketone and propenyl 2-(sodium thiosulfato)ethyl ketone are useful as modifiers for polymers containing active hydrogen, especially cellulose.

2 Claims, No Drawings

SODIUMTHIOSULFATOETHYL KETONES AND THEIR USE AS POLYMER MODIFIERS

RELATED APPLICATIONS

This application is a division of application Ser. No. 650,148, now U.S. Pat. No. 3,506,676 issued Apr. 14, 1970, which in turn was a division of application Ser. No. 455,333 filed May 12, 1965, now U.S. Pat. No. 3,338,883 issued Aug. 29, 1967, which in turn was a continuation-in-part of application Ser. No. 99,673 filed Mar. 31, 1961 and application Ser. No. 404,525 filed Oct. 16, 1964, both now abandoned.

The present invention relates to a process for modifying polymeric compounds containing active hydrogen, and also relates to modifier reactants for use in such process. In addition, the invention relates to the modified polymeric materials produced in accordance with the aforementioned process.

The presence of certain substituents or side-chains in polymeric materials will alter the chemical and/or physical properties of the polymer. Thus, polymers may desirably be modified or tailor-made to provide a preferred set of properties which will make the polymer suitable for a particular end use. It is theoretically possible to obtain a polymeric material with a desired set of properties, although such synthesis may be difficult or impossible for practical reasons. Thus, a more realistic approach to this problem involves starting with the basic polymer and treating it to introduce substituents or side-chains to impart the desired characteristics. In the case of naturally occurring polymers such as cellulose, starch, and keratin, the latter approach is the only possible course of action.

The polymeric materials with which the present invention is concerned are those which include active hydrogen. The active hydrogen may be in the form of hydroxyl groups, amino groups and amide groups, for example. The polymeric materials of interest include the natural polymers such as starches, including the cereal starches, root starches and others, cellulose, regenerated cellulose and modified cellulose; proteins, polysaccharides; and other like materials. Among the synthetic polymeric materials with which the present invention is concerned are polyvinyl alcohol; partially saponified polyvinyl acetate; polyamines; polyamides; and the like. In short, any polymeric material in which the repeating group contains hydroxyl, amino, mercaptan and/or amide radicals is suitable for treatment in accordance with the present invention.

Among the prior art methods which have been used for the modification of polymers of the type discussed above is the reaction with activated olefinic compounds under basic conditions.

This reaction can be presented by the following generic equation:

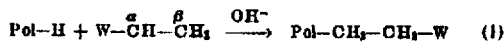

In reaction (1), the symbol Pol-H is used to designate a repeating unit of the polymer which contains an active hydrogen (H), and W represents an activating radical. The use of an activating radical connected to the alpha carbon atom of an ethylenic radical to increase the reactivity of the alpha-beta double bond is well known. An activating radical is defined as an electron attracting radical which stabilizes carbonions (Hine, Physical Organic Chemistry, 1956, p. 223) and induces polarization of the organic group to which it is linked. The activating radical is also termed an "electronegative activating" radical to indicate that the radical tends to withdraw electrons from conjugated systems, i.e., such groups are electron-attracting. This phenomenon is discussed in detail in Gould, "Mechanism and Structure in Organic Chemistry" Holt, Rinehart, Winston - N.Y. 1959, Library of Congress Catalog Card No. 59-8696, pp. 217–218.

As indicated in the foregoing reference, the following are known electronegative activating radicals:

The following activated olefinic compounds are typical of those which may theoretically be utilized in reaction (1):

| Formula | Name |
|---|---|
| $CH_2=CH-CN$ | Acrylonitrile. |
| $CH-CN$<br>$\|\|$<br>$CH-CN$ | Dinitrile of maleic acid. |
| $CH_2=CHCOOH$ | Acrylic acid. |
| $CH_2=CH-\overset{O}{\underset{\|\|}{C}}-CH_3$ | Methyl vinyl ketone. |
| $CH_2=CH-\overset{O}{\underset{\|\|}{C}}-H$ | Acrolein. |
| $CH_2=CH-CONH_2$ | Acrylamide. |

In reaction (1), set forth above, the ethylenic carbon atoms were shown to have only hydrogen atoms associated therewith. Of course, it is also theoretically possible to utilize electronegative activating radicals in conjunction with an ethylenic radical in which hydrocarbon side-chains are connected to either or both of the alpha and beta carbon atoms. In the following list, there are shown typical examples of such compounds.

| Formula | Name |
|---|---|
| $CH_3-CH=CH-COOH$ | Crotonic acid. |
| $CH_3-CH=CH-COOR$ | Alkyl crotonation. |
| $\underset{CH_3}{\overset{CH_3}{>}}C=CH-\overset{O}{\underset{\|\|}{C}}-CH_3$ | Mesityl oxide. |
| $CH_2=\underset{CH_3}{\overset{\|}{C}}-COOH$ | Methacrylic acid. |

Each of the compounds shown in the above classes is characterized by the fact that the electronegative activating radical contains a terminal carbon atom which connects the activating radical to the ethylonic residue.

The use of activated compounds of the type set forth above for modifying textile fibers or fabrics made from active hydrogen-containing polymers has been of continuing interest. However, because of the practical limitations peculiar to the textile industry, it has not been possible to achieve the very desirable modifications which could be brought about by treatment of textile materials with modifying reactants of the type described above. Thus, for example, the activated olefinic compounds of the prior art are generally toxic and many of them exhibit lachrymatory and vesicant properties which severely limit their commercial usefulness. Extreme caution must be exercised in handling these compounds, and it is usually necessary to provide a completely closed system in order to avoid the hazardous conditions which would otherwise prevail. The use of closed reaction vessels from which toxic vapors cannot escape is costly. It is feasible in the chemical manufacturing industry, but it is completely impractical in the textile industry where processing of fibers, yarns and fabrics is usually carried out in open equipment, and where a vast surface is exposed to the atmosphere during processing.

The activated olefinic compounds of the prior art are generally volatile. While losses through evaporation can be controlled by the use of reflux condensors and closed systems in the case of bulk reactions, this clearly cannot be accomplished in a practical manner when the reaction is carried out on textile materials in open equipment.

The solubility of the activated olefinic compounds in water is, in most instances, very low. Since water is an inexpensive and highly desirable reaction medium for the modification of polymers, and particularly of textiles, compounds of limited water solubility are not suitable as reagents for the chemical modification of fibers.

The activated compounds often exhibit a strong tendency to polymerization and self-condensation. Thus, their reaction with the active hydrogen of the polymers is accompanied by the formation of homopolymers and graft polymers is an uncontrolled fashion. These by-products are often difficult to remove and may impair the properties of the modified polymers.

When the activated compounds are used in aqueous medium under alkaline conditions, they readily react with water, as indicated by the following equation:

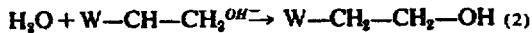

Thus, by-products are formed, greatly decreasing the efficiency of the reagents and also decreasing the yield of modified polymer.

In view of the difficulties listed above, the activated olefinic compounds of the prior art have not generally been employed for the modification of polymers containing active hydrogen.

Accordingly, it is an object of the present invention to provide compounds which will perform in a manner similar to the prior art activated olefinic compounds, while at the same time being free from many of the undesirable characteristics of the prior art compounds.

It is another object of the present invention to provide a process for modifying polymers containing activated hydrogens in order to impart desirable characteristics to the polymers.

An additional object of the present invention is to provide polymers which have been modified by reaction with the compounds of the type contemplated by this invention.

In accordance with the present invention, a new class of activated compounds has been developed for use in modifying and treating polymeric materials containing active hydrogen. As a class, the active compounds of the present invention tend to be non-volatile, relatively non-toxic, and in many cases, water-soluble. Thus, treatment of polymers containing active hydrogen with the activated compounds of the present invention requires no special equipment and results in relatively high yields and the substantial absence of undesirable by-products.

One class of the activated compounds contemplated by the present invention may be represented by the following formula:

in which W represents an electronegative activating radical as defined above, $R_1$ and $R_2$ are selected from the group consisting of hydrogen and substituted and unsubstituted alkyl radicals of up to about five carbon atoms; and Y represents a polar residue derived from a reagent of weak nucleophilic character.

Typical activated compounds of the type shown by generic formula (3) are as follows:

where W is CN, $R_1$ and $R_2$ are H, and Y is $SSO_3Na$,

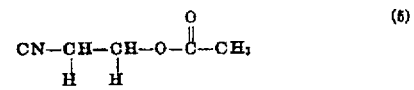

where W is CN, $R_1$ and $R_2$ are H, and Y is $OCOCH_3$.

In formulas (4) and (5) above, W denotes the electronegative activating radical "CN". Other typical electronegative activating radicals are also set forth above. It is to be appreciated that certain of the electronegative activating radicals may, in fact, be part of a larger organic structure which includes components which do not affect the activating influence exerted by the activating radical. Such organic structures are typified by the following:

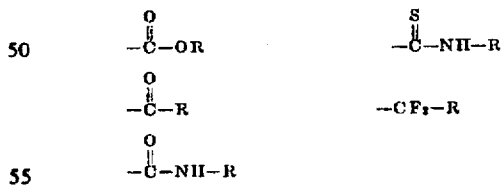

where R may be hydrogen or an organic radical.

A system of nomenclature which may be used to define those compounds in which the electronegative activating radical is a part of a larger organic structure, as well as those compounds in which the electronegative activating radical alone is attached to the alpha carbon of the ethylenic residue is as follows:

where X is an organic structure comprising at least one electronegative activating radical having a terminal carbon atom, X being attached to the alpha carbon of the ethylenic residue through said terminal carbon atom, and $R_1$, $R_2$, and Y are as defined above in formula (3).

Typical examples of compounds falling within generic formula (6) are as follows:

$$(H_2N-CO-CH-CH-\overset{+}{N}C_5H_5)Cl^- \quad (7)$$
$$\qquad\qquad\qquad\quad | \quad |$$
$$\qquad\qquad\qquad CH_3 \ H$$

where X is
$$\overset{O}{\underset{\|}{-C-NH_2}}$$

$R_3$ is $CH_3$, $R_2$ is H, and Y is $NC_2H_5Cl^+$ $$CH_3-\overset{O}{\underset{\|}{C}}-CH_2-CH_2-SSO_3Na \quad (8)$$

where X is
$$\overset{O}{\underset{\|}{CH_3-C-}}$$

$R_1$ and $R_2$ are H, and Y is $SSO_3Na$.

It is to be appreciated that in some instance, X and W may be used interchangeably. Thus, for example, the compound of formula (4) above, may be generically represented as follows:

$$\underset{R_1 \ \ R_2}{X-CH-CH-Y} \quad (9)$$

where X is CN, $R_1$ and $R_2$ are H, and Y is $SSO_3Na$.

As indicated, the radical Y is a polar residue derived from a reagent of weak nucleophilic character. Nucleophilic character is defined as the tendency to denote electrons or share them with a foreign atomic nucleus (Gilman - Organic Chemistry - Second Edition : Vol. II, p. 1859). Specifically, Y is the conjugate base of a Lowry-Breneted acid which has a dissociation constant in water between about $5 \times 10^{-2}$ and $5 \times 10^{-6}$. (See Hine, "Physical Organic Chemistry," Second Edition, McGraw-Hill 1962, p. 43).

Specific examples of Y are the following:

(a) Anion of a strong inorganic acid
 —$OSO_3^-$   Sulfate
 —$SSO_3^-$   Thiosulfate
 —$OPO_3^+$   Phosphate in which the negative charges are satisfied by suitable counter-ions such as alkali metal or ammonium.

(b) Anion of strong organic acid
 —$OCOCH_3$  Acetate
 —OCOH     Formate
 —$OCOC_2H_5$ Propionate
(c) Cation of weak base
 —$\overset{+}{N}C_5H_5$ Pyridinium
 $\ \ CH_3$
 —$\overset{+}{N}$—$CH_3$ Benzyl dimethylammonium
 $\ CH_2C_6H_5$
 —$\overset{+}{N}C_9H_7$ Isoquinolinium
 —$\overset{+}{N}C_6H_6$ Picolinium where the positive charge is satisfied by a suitable counter-ion such as halide.

The reaction of a polymeric material containing active hydrogen with an activated compound of the present invention may be represented by the following:

$$Pol-H + X-CH-CH-Y \xrightarrow{OH^-}$$
$$\qquad\qquad\quad |\quad\ |$$
$$\qquad\qquad\ R_1\ \ R_2$$

$$X-CH-CH-Pol + Hy$$
$$\quad\ |\quad\ |$$
$$\ \ R_1\ \ R_2 \qquad\qquad (10)$$

In the above equation (10), the basic conditions under which the reaction is conducted catalyzes the splitting out of HY from the activated compound, thereby providing a double bond across which the active hydrogen-containing polymer may add. The alkaline environment also reduces the concentration of HY, thereby advantageously affecting the control of the reaction.

The specific reaction of cellulose with compound (4), shown above, may be represented by the following equation:

$$CN-CH_2-CH_2-SSO_3Na + Cell-OH \xrightarrow{OH} CH-CH_2- \\ CH_2-O-Cell + HSSO_3Na \quad (11)$$

In reactions (10) and (11), X, which includes the activating radical, and the polar residue Y, both exert an influence on the alpha and beta carbon atoms of the ethylenic residue of the activated compounds. The alpha carbon assumes a negative character and the beta carbon assumes a positive character. Under basic conditions, the radical HY is eliminated and is neutralized by the hydroxyl ions present. The unsaturated structure formed by splitting out HY then reacts with the polymeric material.

Thus, the activated compounds of the present invention serve the function of the prior art activated olefinic compounds, while at the same time eliminating the undesirable features of the prior art compounds. In the present invention, olefinic compounds are formed in situ, and reaction with the active hydrogen-containing polymers then occurs. By proper control of reaction conditions, the formation of olefinic compounds can be made to occur at a rate which is comparable to the rate at which such compounds react with the polymer. Accordingly, the concentration of the toxic, volatile, unsaturated compounds in the system at any given time may be maintained at a low value and the formation of undesirable by-products is effectively avoided.

The preparation of activated ethylenic compounds corresponding to formula (6) above, can be carried out by several methods. The selected method of synthesis depends on the structure of the compound, and on the availability of suitable reactants. Some of the reactions which can be employed are indicated in equations (12) through (16):

$$X-C-CH + M_2SSO_3 + H_2O \longrightarrow$$
$$\ \ |\ \ |$$
$$\ R_1\ R_2 \qquad\qquad CH-CHSSO_3M + MOH$$
$$\qquad\qquad\qquad\qquad\ \ |\quad\ |$$
$$\qquad\qquad\qquad\qquad\ R_1\ \ R_2 \qquad (12)$$

$$X-CH-CHA + M_2SSO_3 \longrightarrow$$
$$\ \ |\quad\ |$$
$$\ R_1\ \ R_2 \qquad\qquad XCH-CHSSO_3M + MA$$
$$\qquad\qquad\qquad\qquad\ \ |\quad\ |$$
$$\qquad\qquad\qquad\qquad\ R_1\ \ R_2 \qquad (13)$$

$$X-CH-CHOH + HOSO_2NH_2 \longrightarrow$$
$$\ \ |\quad\ \ |$$
$$\ R_1\ \ R_2 \qquad\qquad XCH-CHOSO_2NH_4$$
$$\qquad\qquad\qquad\qquad\ \ |\quad\ |$$
$$\qquad\qquad\qquad\qquad\ R_1\ \ R_2 \qquad (14)$$

$$X-C-CH + Q=MN \longrightarrow$$
$$\ \ |\ \ |$$
$$\ R_1\ R_2 \qquad \left[\begin{matrix}XCH-CHN=Q\\ |\quad\ |\\ R_1\ \ R_2\end{matrix}\right]A^- \quad (15)$$

$$X-CH-CHA + Q\cdot N \longrightarrow$$
$$\ \ |\quad\ |$$
$$\ R_1\ \ R_2 \qquad \left[\begin{matrix}XCH-CHN=Q\\ |\quad\ |\\ R_1\ \ R_2\end{matrix}\right]A^- \quad (16)$$

where X is an organic structure comprising an electronegative activating radical; $R_1$ and $R_2$ are selected from the group consisting of hydrogen and a substituted or unsubstituted alkyl radical of up to five carbon atoms; M is selected from the group consisting of alkali metal ions and ammonium; A is halogen; and N = Q represents a tertiary amine in which the three valences of the nitrogen atom are satisfied by means of carbon-nitrogen bonds, and in which Q is either (1) part of a heterocyclic ring of which the nitrogen atom is also a part, or (2) three monovalent radicals.

Set forth below are some examples which illustrates both the preparation of the activated ethylenic compounds of the present invention as well as their use in modifying or treating active hydrogen-containing polymers.

EXAMPLE 1

Preparation of cyanoethylthiousulfate ($NCCH_2CH_2SSO_3Na$) from acrylonitrile and sodium thiosulfate 248 g (1 M) of sodium thiosulfate pentahydrate were dissolved in 248 ml of buffer solution having a pH of 7.6 and prepared by dissolving 1.22 g. citric acid and 28.1 g $Na_2HPO_4$ in 1,000 ml. of distilled water. To this solution, 53 g. (1 M) of acrylonitrile were added dropwise. The temperature was maintained at 60°C. The liberated NaOH was neutralized by the gradual addition of glacial acetic acid. The pH was maintained between 6.5 and 8.0. After 9 hours reaction time, the conversion, calculated from the residual unreacted $Na_2SSO_3$ was 80 percent of the theoretical.

Analysis of the crude reaction mixture by alkaline hydrolysis gave a 16.4 percent bound thiosulfate content, corresponding to 19.6 percent cyanoethylthiosulfate in the solution. The yield calculated from the bound thiosulfate content was thus 64 percent of the theoretical.

EXAMPLE 2

Preparation of cyanoethylthiosulfate from β-chloropropionitrile and sodium thiosulfate 248 g (1M) $Na_2S_2O_3.5H_2O$ dissolved in 248 ml. of water were mixed with 89.5 g. (1 M) of β-chloropropionitrile dissolved in 100 g. of ethanol. The reaction mixture was refluxed for 8 hours. The conversion, calculated from the residual unreacted $Na_2S_2O_3$, was 97 percent.

After completion of the reaction, the alcohol and a portion of the water were removed under reduced pressure until a saturated solution was obtained. The pH of the solution was then adjusted to 7.0. This saturated solution (585 grams) contained 0.25 percent free $Na_2S_2O$ and 28.3 percent cyanoethylthiosulfate, calculated from the bound $Na_2S_2O_3$ content. The yield was 87.5 percent of the theoretical.

After keeping the saturated solution in a refrigerator overnight, white crystals were obtained. These were filtered, dried and analyzed for bound $Na_2S_2O_3$ content. The equivalent weight, calculated from the results of this analysis was 222 (calculated 189). This corresponds to a dihydrate (calculated eq. wt. for dihydrate 225).

EXAMPLE 3

Preparation of cyanoethyl pyridinium chloride ($NCCH_2CH_2NC_5H_5$)Cl⁻ from acrylonitrile and pyridine hydrochloride 79.5 g. (1.5 M) of acrylonitrile and 448 g. of a 38.5 percent solution of pyridine hydrochloride in ethanol (corresponding to 172.5 g. (1.5 M) pyridine hydrochloride) were mixed with 400 g. ethanol, and 5 ml. of triethylamine catalyst were added to the reaction mixture.

After standing for 3 days at room temperature, a portion of the solvent was removed under reduced pressure, and the concentrated solution was stored in a refrigerator overnight. White crystals separated out, and were filtered and dried. The yield was 80 percent of the theoretical. The equivalent weight of the crystalline product, determined by electrometric titration with standard NaOH, was 181 (calcd. 168.5).

The ionic chloride content was 23.1 percent (calcd. 21.1 percent).

EXAMPLE 4

Preparation of cyanoethyl pyridinum chloride from β-chloropropionitrile and pyridine 89.5 g (1 M) of β-chloropropionitrile and 79.1 g. (1 M) of pyridine were dissolved in 250 ml. of butyl alcohol. The reaction mixture was refluxed for 92 hours. The butanol was removed under reduced pressure. The residue (a solid waxy product) was heated at 65° C. for 3 hours at 5 mm vacuum in order to remove residual solvent. The crude product so obtained had an equivalent weight (determined by electrometric titration with standard NaOH) of 185 (calcd. 168.5).

The ionic chloride content was 21.6 percent (calcd. 21.1 percent).

The yield of product was 87 percent of the theoretical.

EXAMPLE 5

Preparation of cyanoethylacetate ($NCCH_2CH_2OCOCH_3$) from ethylene cyanohydrin and acetic acid 71.1 g (1 M) of ethylene cyanohydrin and 72 g. (1.2 M) of acetic acid were refluxed in 50 g. of benzene with 1 g. conc. sulfuric acid catalyst for 16 hours. The liberated 19 ml. water was distilled azeotropically through a Dean Stark moisture trap. The solvent was then removed under reduced pressure, and the residue was distilled in vacuo.

The product was obtained as a clear, colorless liquid boiling at 110°–111° C. at 25 mm. The yield was 86 percent of the theoretical.

EXAMPLE 6

A. Preparation of cyanoethyl sulfate, ammonium salt ($NCCH_2CH_2SO_3NH_4$)

532.5 g. (7.5 M) of ethylene cyanohydrin were stirred and heated with 763.8 g. (7.5 M + 5 percent excess) of sulfamic acid in the presence of 54.0 g. urea. The reaction was exothermic. By suitable control of the external heating, the temperature of the reaction mixture was maintained between 115° and 130° C. for 1 hour, and at the end of this time the reaction was complete. On cooling, the reaction mixture formed a solid white crystalline mass of crude product which had an equivalent weight of 173 (calcd. 168). The free sulfamic acid content of the crude product was lower than 1 percent. Even without purification, the ammonium salt of cyanoethyl sulfate.

was thus obtained in excellent purity. The yield was 92 percent of the theoretical.

If desired, the product could be further purified by crystallization from organic solvents, yielding a snow white crystalline powder, melting at 74°–76° C.

B. Preparation of cyanoethyl sulfate, sodium salt NCCH$_2$CH$_2$OSO$_3$Na)

120 g. of a 38 percent aqueous solution of the ammonium salt of the cyanoethyl sulfate (product of example 6 (A)) was passed through an ion exchange resin column, which contained 200 ml. of wet Amberlite IR-120H. The conversion to the free acid (as determined by titration of the solution obtained) was essentially quantitative.

60 g. of the solution of the free acid (containing 20.5 percent cyanoethyl sulfuric acid) were neutralized with sodium carbonate powder, and the water was removed under reduced pressure. The product which crystallized out was washed with acetone and obtained as a white crystalline solid melting at 176°–178° C. Equivalent weight 184 (calcd. 173). The yield was 84 percent of the theoretical.

EXAMPLE 7

Preparation of carbamoethylthiosulfate (H$_2$NCOCH$_2$CH$_2$SSO$_3$Na) from β-chloropropionamide 32.25 g (0.3M of β-chloropropionamide were dissolved in 32 g. of ethanol and the solution was mixed with 74.4 g. (0.3 M) Na$_2$S$_2$O$_3$.5H$_2$O dissolved in 74.4 ml. water. The reaction mixture was then refluxed for 10 hours. At the end of this time. 95 percent of the thiosulfate present had reacted.

The alcohol and a portion of water were removed under reduced pressure, and a saturated solution was obtained. The solution (213 grams) contained 27 percent carbamoethylthiosulfate, as determined by analysis of the bound thiosulfate content. The yield was 86 percent of the theoretical.

EXAMPLE 8

Preparation of sodium salt of carboxyethylthiosulfate (NaOOOCH$_2$CH$_{23}$Na) from β-chloropropionic acid 124.0 g. (0.5M) of Na$_2$S$_2$O$_3$·5H$_2$O were dissolved in 124 ml. of H$_2$O. To this solution were added 54.25 g (0.5M) of β-chloropropionic acid dissolved in 166.2 g. of an aqueous solution containing 20 g. (0.5 M) of NaOH. The reaction mixture was refluxed for 8 hours, and the conversion achieved was 93.5 percent of the theoretical, calculated from the amount of Na$_2$S$_2$O$_3$ consumed.

The alcohol and a portion of the water were then removed under reduced pressure until a saturated solution was obtained. This solution contained 41 percent of carboxyethylthiosulfate, calculated from the bound Na$_2$S$_2$O content and weighed 285 grams. The yield was therefore 97 percent of the theoretical.

EXAMPLE 9

Preparation of Bunte salt (HOCCH$_2$CH$_2$SSO$_3$Na) from acrolein and sodium thiosulfate.

248 g. (1 M) of Na$_2$S$_2$O$_3$·5H$_2$O were dissolved in 248 g. of a buffer solution at pH = 7.6 prepared as described in Example 1. 56 g. (1 H) of acrolein were added dropwise to this solution at room temperature.

The pH of the reaction mixture was maintained between 6.5–8.0 by gradual addition of the glacial acetic acid in the course of reaction.

After 1 hour reaction time, the conversion calculated from the Na$_2$S$_2$O$_3$ consumed was 73 percent, and a somewhat cloudy solution was obtained. After filtration, the solution was analyzed for bound Na$_2$S$_2$O$_3$ content and found to contain the desired product in 17 percent concentration. The acrolein odor was no longer noticeable, and the aqueous solution did not have any lachrymatory effect.

EXAMPLE 10

Preparation of bis-thiosulfate (NaO$_3$SSCH$_2$CH$_2$COOCH$_2$CH$_2$OCOCH$_2$CH$_2$SSO$_3$Na) from the bis-β-chloropropionate of ethylene glycol 49.6 g (0.2 M) of Na$_2$S$_2$O$_3$·5H$_2$O were dissolved in 50 ml. water, and the solution was mixed with 24.3 g. (0.1 M) of ethylene glycol bis-β-chloropropionate dissolved in 25.0 g. of ethanol. The reaction mixture was refluxed for 8 hours.

The conversion, calculated from the Na$_2$S$_2$O$_3$ consumption was 100 percent.

The clear aqueous solution so obtained contained 39.6 percent of the desired product, calculated from the value obtained analytically for the bound Na$_2$S$_2$O$_3$ content.

EXAMPLE 11

Preparation of Bunte salt (CH$_3$COCH$_2$CH$_2$SSO$_3$Na) from methyl-vinyl-ketone 49.6 g. (0.2 M) of Na$_2$S$_2$O$_3$·5H$_2$O dissolved in 50.0 g. of a buffer solution at pH 7.6 prepared as described in Example 1. 14.0 g. (0.2 M) of methyl-vinyl-ketone were added dropwise to the thiosulfate solution at room temperature. The liberated NaOH was neutralized by adding glacial acetic acid to the reaction mixture. The pH was maintained between 6.5 and 8.0.

The conversion calculated from the Na$_2$S$_2$O$_3$ consumption was 73 percent.

The solution contained 17.4 percent of the desired product, calculated from the value obtained analytically for the bound thiosulfate content.

EXAMPLE 12

Preparation of carboxyethyl pyridinium chloride (HOCOCH$_2$CH$_2$NC$_5$H$_5$)Cl⁻ from acrylic acid and pyridine hydrochloride 36.0 g. (0.5 M) of acrylic acid and 180 g. of a 38.5 percent solution of pyridine hydrochloride in ethanol (corresponding to 0.6 M of pyridine hydrochloride), were dissolved in 300 g. of acetone, and 1 ml. of triethylamine catalyst was added to the reaction mixture. After 3 days reaction time at room temperature, a crop of white crystals was obtained. The equivalent weight of the crystalline product, determined by electrometric titration with standard NaOH solution was 188 (calcd. 187.5).

The ionic chloride content was 20.0 percent (calcd. 18.9 percent).

EXAMPLE 13

Preparation of carboxyethyl pyridinium chloride from β-chloropropionic acid and pyridine 43.4 g. (0.4 M) of β-chloropropionic acid and 79.1 g. (1 M) of pyridine were refluxed in 200 ml. of petrol ether for 10 hours.

The conversion was determined by analyzing the ionic chloride content of the reaction mixture, and found to be 50 percent. The crystalline product which precipitated was filtered and dried in a vacuum desiccator. The ionic chloride content of the crystalline product was 18.65 percent (calcd. 18.9 percent). The equivalent weight, determined by electrometric titration with standard NaOH solution, was 197 (calcd. 187.5).

EXAMPLE 14

Cyanoethylation of cotton fabric with cyanoethyl sulfate, ammonium salt (product of Example 6(A) above)

A. A sample of bleached, desized cotton fabric (80 × 80 print cloth) was treated on a laboratory padder with a 76 percent aqueous solution of the ammonium salt of cyanoethyl sulfate. The fabric retained 1.16 grams of solution per gram of fabric. After drying in a laboratory oven at 60°-70° C., the fabric was treated with a 35 percent solution of NaOH on a laboratory padder, and found to retain 0.59 grams of NaOH solution per gram of fabric. The ratio of NaOH to cyanoethylsulfate was thus about 0.5 equivalents. After standing wet for 60 minutes at room temperature, the sample was neutralized with a 5 percent acetic acid solution, washed in a 1 percent detergent solution at 50° C. for 15 minutes, and rinsed thoroughly.

The treated fabric exhibited greatly increased heat resistance. After 18 hours exposure to heat in an oven at 80° C., the treated sample lost 44 percent of its tensile strength in the warp direction, while the untreated fabric lost 80 percent of its original tensile strength. The treated fabric also exhibited improved acid resistance. After treatment with a 20 percent solution of sulfuric acid at room temperature for 72 hours, the treated fabric lost only 26 percent of its original tensile strength in the warp direction, while the untreated sample lost 54 percent of its tensile strength after the acid treatment.

B. The procedure of Example 14(A) was repeated, but a 40 percent solution of NaOH was used in place of the 35 percent solution used above, and the sample was soaked in the NaOH solution for 1 minute before passing through the rolls of the laboratory padder. The ratio of NaOH to cyanoethylsulfate was 0.84 equivalents. After reacting at room temperature for 30 minutes, neutralizing and washing, the fabric showed a weight increase of 10.86 percent. This corresponds to a 45 percent yield of cyanoethyl groups introduced. The nitrogen content of the treated fabric determined analytically was 2.77 percent (calculated from the weight increase 2.86 percent).

After heat exposure for 18 hours at 80° C., the treated fabric lost only 32 percent of its warp tensile strength, and after treatment with 20 percent $H_2SO_4$ for 72 hours at room temperature, it lost only 24 percent of the original tensile strength in the warp direction.

C. A cotton sample (80 × 80 print cloth) was padded with a 76 percent solution of cyanoethylsulfate at 116 percent wet pickup and after drying, it was soaked for 1 minute in a 35 percent solution of NaOH, and then passed through the rolls of a laboratory padder. The wet pickup of the NaOH solution was 82 percent. The ratio of NaOH to cyanoethylsulfate was 0.69 equivalents. After 60 minutes reaction time, the weight gain obtained was 9.18 percent corresponding to 38.0 percent yield.

Then the treated sample was exposed again to the same treatment. The total weight gain for the combined treatments was 19.71 percent. The nitrogen content was 4.43 percent calculated from the weight gain 4.45 percent). (D) The double treatment procedure outlined in Example No. 14 (C) was repeated, but in place of the 35% NaOH solution, a 40% NaOH solution was used, and the reaction time was decreased from 60 minutes to 30 minutes.

The total corrected weight gain was 19.6 percent (corresponding to a 42 percent yield). The nitrogen content was 4.63 percent (calculated from the weight gain 4.4 percent).

After heat exposure, the sample lost only 23 percent and after acid treatment, only 17 percent of its original warp tensile strength.

EXAMPLE 15

Cyanoethylation of cotton fabric with cyanoethylsulfate, sodium salt (product of Example 6 (B) )

A. A sample of bleached, desized cotton fabric was padded with a 44 percent aqueous solution of the product of Example 6 (B). The wet pickup was 120 percent. The fabric was dried at 60°-70° C., then treated by padding with a 20 percent solution of sodium hydroxide. The ratio of NaOH to cyanoethylsulfate was 1.3. The wet fabric was allowed to stand at room temperature for 30 minutes, then neutralized and washed. The weight increase was 8.7 percent, corresponding to a 54 percent yield of cyanoethyl groups introduced. The nitrogen content of the treated fabric was 2.37 percent (calculated from the weight increase 2.32 percent). The heat resistance and acid resistance of the treated fabric were outstanding.

B. The procedure of Example 15 (A) was repeated, except that a 25 percent solution of NaOH was used, yielding a NaOH cyanoethylsulfate ratio of 1.8. The weight increases, obtained were 11.6 percent (corresponding to a yield of 72 percent) and 13.5 percent (corresponding to a yield of 83 percent) for samples reacted 30 and 60 minutes, respectively.

EXAMPLE 16

Cyanoethylation of cotton with cyanoethylthiosulfate (product of Example 2)

A. A sample of bleached, desired cotton fabric (80 × 80 print cloth) was treated on a laboratory padder with a 26 percent solution of cyanoethylthiosulfate. After two consecutive paddings (with intermediate drying), a total of 0.47 grams of cyanoethylthiosulfate per gram of fabric was deposited on the fabric. After drying, the fabric was soaked for 1 minute in a 30% NaOH solution and passed through the rolls of a laboratory padder. The amount of NaOH deposited was 0.26 grams per gram of fabric. The ratio of NaOH to cyanoethylthiosulfate ratio was 2.4 equivalents. After 30 minutes reaction time at room temperature, the treated fabric was neutralized in a 5 percent acetic acid solution, then washed in 1 percent Triton X-100 solution at 160° F., for 15 minutes.

The weight gain obtained was 6.1 percent after correcting for the difference in moisture regain between the treated and untreated fabric. This corresponds to a 45.5 percent reaction yield. The nitrogen content of the treated fabric was 1.63 percent (calculated from the weight gain 1.61 percent).

After 18 hours heat exposure at 80° C., the treated sample lost only 32 percent of its warp tensile strength, while an untreated control sample lost 82 percent of its warp tensile strength after the same heat exposure.

B. The sample treated as outlined in Example 16 (A), was exposed to the same treatment a second time. The total corrected weight gain was 11.7 percent. The nitrogen content was 2.15 percent (calculated from the weight gain 3.0 percent).

C. The procedure of Example 16 (A) was repeated, but instead of two paddings, three consecutive paddings were employed, resulting in depositing a total of 0.66 grams of cyanoethylthiosulfate per gram of fabric. The ratio of NaOH to cyanoethylthiosulfate was 1.07 equivalents. The corrected weight gain obtained was 7.6 percent corresponding to a 41.0 percent yield of cyanoethylated cotton.

D. The sample treated as outlined in Example 16 (C) was treated again with two additional paddings. The total corrected weight gain was 11.5 percent, corresponding to an overall yield of 38.5 percent.

EXAMPLE 17

Cyanoethylation of rayon with cyanoethylthiosulfate, sodium salt

A sample of rayon challis fabric was padded with a 28 percent cyanoethylthiosulfate solution at 95 percent wet pickup. After drying, the sample was padded with a 5% NaOH solution at 82.5 percent wet pickup. The NaOH/cyanethylthiosulfate ratio was 0.73 equivalents. After 2 hours reaction time at room temperature, the treated sample was neutralized in 5% CH₃COOH solution, washed in a 1 percent detergent solution for 15 minutes, then rinsed thoroughly.

The weight gain was 2.6 percent, corresponding to a 34.6 percent yield.

Similar results were obtained when cyanoethyl sulfate was used in place of cyanoethylthiosulfate.

EXAMPLE 18

Cyanoethylation of starch with cyanoethylsulfate, ammonium salt 150 g. of corn starch were slurried with 180 ml. of water. 95 grams of a 76 percent solution of the ammonium salt of cyanoethyl sulfate and 10 g. of 10 percent Triton X-100 solution or other nonionic wetting agent were then added to the reaction mixture. After 10 minutes stirring 100 g. of a 34.3 percent NaOH solution were added to the reaction mixture. After reaction for one hour at room temperature, the cyanoethylated starch was filtered, washed with water several times and dried.

The nitrogen content was 2.08 percent, corresponding to a 50 percent reaction yield.

10 grams of the modified starch were suspended in 90 g. of water and the suspension was heated to the boil. A similar suspension prepared from unmodified starch was similarly heated. On standing at room temperature after cooling, the cyanoethylated starch suspension did not show any growth of mildew for 10 days. The suspension prepared from the untreated starch showed appreciable mildew growth after only 24 hours.

EXAMPLE 19

Cyanoethylation of cellophane

A cellophane film was immersed in a 76 percent solution of the ammonium salt of cyanoethyl sulfate. Then it was wrapped in a cotton bag and centrifuged to 110 percent wet pickup. The extracted cellophane sample was then soaked in a 35% NaOH solution for 1 minute, squeezed and allowed to stand for 30 minutes at room temperature. It was neutralized with 5 percent acetic acid solution and washed several times with cold water.

The nitrogen content of the cyanoethylated film was 2.18 percent, corresponding to a 31 percent reaction yield.

EXAMPLE 20

Cyanoethylation of polyvinyl alcohol 75 grams of a polyvinyl alcohol resin (product marketed under the trade name of Elvanol 70–05 by the E.I. du-Pont Co.) were dispersed in 150 ml. of water. 47.5 g. of a 76 percent solution of the ammonium salt of cyanoethyl sulfate were added to the dispersion. After 10 minutes, 100 g. of 17.5 percent NaOH solution were added to the reaction mixture. After 1 hour reaction time at room temperature, the mixture was neutralized with 56 percent acetic acid solution.

The modified polyvinyl alcohol resin was precipitated with acetone from the neutralized reaction mixture, filtered, washed several times with acetone and dried in a desiccator.

20 grams of the product obtained were dispersed in 100 ml. of water at 70° C., and a film was cast from this dispersion. The film was dried at 65° C., for 2 hours, then washed several times in cold water in order to remove inorganic salts. The nitrogen content of the film so obtained was 1.01 percent.

EXAMPLE 21

Reaction of Bunte Salt prepared from ethylene glycol chloropropionate and sodium thiosulfate (product of Example 10) with cotton A sample of 80 × 80 print cloth was padded with a 39.6 percent solution of the product of Example 10 to a wet pickup of 82 percent. The padded sample was dried at 80° C., then it was treated with 20 percent NaOH solution to a wet pickup of 80 percent. The ratio of NaOH to reagent was 2.7 equivalents. After 30 minutes reaction time at room temperature, the treated sample was neutralized in dilute acetic acid solution, washed in detergent solution at 50° C., for 15 minutes, and rinsed. The weight gain obtained was 4.5 percent, corresponding to a reaction yield of 35.5 percent.

The treated sample was insoluble in cellulose solvents and had improved resistance to wrinkling, indicating that cross-linking had taken place by reaction of the bi-functional reagent with cellulose.

A particularly important activating group for use in conjunction with the present invention are ketones. Of particular advantage is the fact that the carbonyl carbon is divalent and therefore imparts a high degree of flexibility in the choice of the overall molecular structure of the activated compounds. One type of ketone-activated ethylenic compound contemplated by the present invention is shown by the following formula:

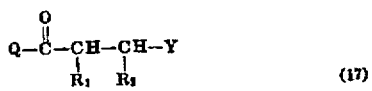
(17)

where Q is a substituted or unsubstituted alkyl, alkenyl, alkynyl, aryl or aralkyl radical and where $R_1$, $R_2$ and Y are as defined above. The notation X, as used and defined hereinabove, if used in formula (17), would replace Q and the carbonyl radical:

(18)

If the notation W is used in a generic formula to cover the compound (17), the formula would be as follows:

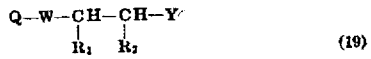
(19)

However, it is expedient to use the Q notation in conjunction with the carbonyl radical to describe the ketone-activated compounds of this invention.

The excellent results which can be obtained when polymers containing active hydrogen atoms are modified with the ketone-activated compounds of the present invention are particularly important for the following reasons. Unsaturated ketones containing the grouping

(20)

are extremely reactive compounds. When $R_1$ and $R_2$ are hydrogen, the compounds tend to polymerize very rapidly, and it is virtually impossible to conduct addition reactions with active hydrogen-containing polymers using conventional techniques. For example, when methyl vinyl ketone ($CH_3COCH=CH_2$) is reacted with cellulose in the presence of an alkaline catalyst, it is necessary to employ up to a thousandfold excess reagent and the resulting modified cellulose must be extracted under vigorous conditions to remove deposits of the polymerized methyl vinyl ketone formed as a by-product. With divinyl ketone, the tendency to polymerization is even greater and the problem is multiplied. Furthermore, olefinic ketones have low vapor pressure, toxicity, and exhibit undesirable lachrymatory and vescicant properties.

When the ketone-activated compounds of the present invention are used, good yields of the desired reaction products are obtained even with moderate amounts of reagent, and even when the polymer is present in excess. No special techniques are required, and no significant amounts of polymeric by-products are formed. Thus, ketone modified polymers which could not be prepared heretofore by known techniques can be obtained. Of particular advantage is the fact that the ketone-activated compounds of this invention have low vapor pressure, reduced toxicities, and do not exhibit extreme lachrymatory or vescicant properties.

The preparation of ketone-modified polymers is a particularly desirable objective, since the carbonyl groups in the modified polymers constitute reactive sites which can be used for further modification of polymer properties.

In the treatment of polymers according to the present process, the polymer is contacted with a ketone-activated compound under basic conditions, and the reaction proceeds as follows:

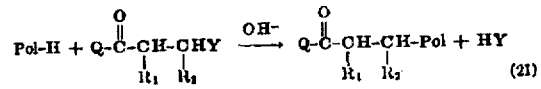
(21)

As described above, the excess base which is present catalyzes the splitting-out of HY and also reacts with the HY thus formed, thereby driving the reaction to completion by removing one of the products of the reaction.

Set forth below are several examples describing both the preparation of ketone-activated reactants and also the use of such reactants for the treatment of active hydrogen-containing polymers.

In the examples which follow, the results reported were obtained according to the following test methods:

| | |
|---|---|
| Carbonyl content: | U. Strole, 1.Eucepa-Symposium, Darmstadt 1958 |
| Crease recovery: | ASTM-D 1295-60T |
| Tear strength: | ASTM-D 1424-63 |
| Tensile strength: (Ravelled Strip) procedure | ASTM-D 1682-59T |
| | AATCC-88-1962T (Temperature of wash water: 140°F. Drying: Tumble) |
| Shrinkage: | Measured after laundering procedure described above. |

EXAMPLE 22

Methyl (2-sodium thiosulfatoethyl) ketone ($CH_3COCH_2H_2SSO_3Na$)

105.0 g. (1.5 mol.) of methyl vinyl ketone were added dropwise at room temperature to 372.0 g. (1.5 mol) of $Na_2S_2O_3$ $5H_2O$ dissolved in 360 ml. of water. Simultaneously with the addition of the ketone, glacial acetic acid was added at such a rate that the pH of the reaction mixture was maintained between 6 and 8. The addition required 2 hours and 81 g. (1.35 mol) of acetic acid were used to keep the pH in the desired range.

After the addition was completed, the neutral reaction mixture contained 0.22 mol of free thiosulfate and 1.28 mol of the desired product, as determined from the bound thiosulfate content of the reaction mixture.

The aqueous solution of the product was concentrated to 566 g. weight by partially removing the water under reduced pressure. A crystalline solid precipitated and was filtered. This solid, weighing 322 grams, contained some methyl thiosulfatoethyl ketone, sodium salt, and inorganic salts. The filtrate weighing 234 grams, contained 1.0 mol (43.5 percent) of the desired product and was essentially free of inorganic salts.

EXAMPLE 23

4-Acetoxybutanone-2; [methyl (2-acetoxyethyl) ketone-$CH_3COOCH_2CH_2COCH_3$]

This compound was prepared by a method similar to that in U.S. Pat. No. 2,857,442. Amberlite IRA-400 (100 g.), an ion-exchange resin manufactured by Rohm and Haas, Philadelphia, Pa., was activated by soaking the resin overnight in 500 ml. of 10 percent aqueous sodium hydroxide. The resin was rinsed with distilled water until neutral, then soaked in 500 ml. glacial acetic acid. The acetic acid (960 g.) and methyl vinyl ketone (280 g.) were combined with the resin and the mixture was stirred for four days at room temperature. After removal of the resin, vacuum fractionation of the liquid gave 4-acetoxybutanone-2 as the fraction with b.p. 78°–81° at 9 mm. (91 g.). Analysis of this sample by reaction with sodium hydroxide showed it to be 93 percent pure.

EXAMPLE 24

Reaction of Cellulose with Methyl (2-sodium thiosulfatoethyl) ketone (product of Example 22)

A sample of plain weave cotton fabric (commonly known as 80 × 80 print cloth) was impregnated with a 25 percent aqueous solution of the product of Example 22, using a laboratory padder and setting the rolls at such a pressure as to give 120 percent wet pickup) 0.3 grams of reagent were thus deposited per gram of cotton fabric. The fabric so treated was framed to the original dimensions and dried in a forced draft oven at 60° C., then treated by padding with an 8.5 percent aqueous solution saturated with NaCl, setting the pad rolls at such a pressure as to give a 114 percent wet pickup. 0.097 g. of KOH were thus deposited per gram of fabric, corresponding to 1.16 equivalent of KOH per equivalent of ketone. The fabric was rolled smoothly on a rubber tube and allowed to stand at room temperature for five minutes, care being taken to prevent evaporation of water by covering the roll with polyethylene sheeting. The fabric was rinsed with a 1 percent acetic acid solution to neutralize residual KOH, then washed at 40°–45° C. The sample was framed and dried. The reaction yielded a 2.33 percent increase in fabric weight corresponding to 22.5 percent reaction yield. The carbonyl content of the fabric was found to be 0.35 percent.

EXAMPLE 25

Reaction of Cellulose with Methyl (2-acetoxyethyl) ketone (product of Example 23)

Samples of 80 × 80 print cloth were impregnated with a 25 percent solution of the product of Example 23. The wet pickup was 80 percent. Without drying, the samples were over-padded with aqueous NaOH solutions of varying concentration, saturated with NaCl. The fabric samples were allowed to stand at room temperature for 1 minute, then they were rinsed with a 1 percent acetic acid solution and washed at 40°–45° C. The samples were framed and dried. The following results were obtained.

| NaOH Conc. % | Weight Gain % | Reaction Yield % of calcd. | % CO Found | Calcd. from Wt. Gain |
|---|---|---|---|---|
| 7.3 | 2.1 | 15 | 0.63 | 0.82 |
| 10.0 | 2.3 | 17 | 0.88 | 0.90 |
| 13.2 | 2.6 | 19 | 0.76 | 1.0 |

EXAMPLE 26

Propenyl-2-Sodium thiosulfatoethyl ketone ($CH_3CH = CHCOCH_2CH_2SSO_3Na$)

Vinyl propenyl ketone (39 g., prepared by the method of Jones and Taylor, J. Chem. Soc. 1961, p.1345) was added dropwise slowly to a solution of sodium thiosulfate pentahydrate (110 g.) in water (110 ml.) and ethanol (25 ml.). The pH of the reaction medium was maintained between 6 and 9 by the dropwise addition of glacial acetic acid (24.4 g.). At the conclusion of the reaction, there was obtained a solution (290 g.) which contained 32 percent propenyl 2-sodium thiosulfatoethyl ketone as determined by analysis for free and bound thiosulfate radicals.

EXAMPLE 27

Reaction of Cellulose with Propenyl-2-sodium-thiosulfatoethyl ketone

Example 24 was repeated but the product of Example 26 was used from aqueous solution for the initial treatment. After the second padding with aqueous NaOH solution saturated with NaCl, the reaction time at room temperature was varied between 2 and 60 minutes. When 33 grams of reagent were deposited per 100 grams of fabric, and the amount of NaOH deposited was varied, the following results were obtained.

| SAMPLE | % NaOH | NaOH Equiv. Reagent Equiv. | Reaction Time | % Wt. Gain | % Yield |
|---|---|---|---|---|---|
| A1 | 6.9 | 1.25 | 2 | 6.3 | 47 |
| A2 | 7.0 | 1.25 | 10 | 7.2 | 53 |
| B2 | 12.0 | 1.60 | 10 | 5.6 | 41 |
| B3 | 12.0 | 1.60 | 30 | 6.8 | 49 |
| B4 | 12.0 | 1.43 | 60 | 8.1 | 58 |

The treated fabric samples contained unsaturation and would be represented by a formula Cell-$OCH_2CH_2COCH = CHCH_3$.

In addition to the Examples set forth above, typical activated reactants of the type in which the activating group activates a single ethylene radical are as follows:

TABLE I

Compounds of the type: $X-\underset{R_1}{CH}-\underset{R_2}{CHY}$

| Compound | $R_1$ | $R_2$ | X | Y |
|---|---|---|---|---|
| 1........ ($H_2NCOCHCH_2NC_5H_5)Cl^-$ $\quad\quad\;\;|$ $\quad\quad\;\;CH_3$ | $CH_3$ | H | $-CONH_2$ | $(-NC_5H_5)Cl^-$ |
| 2........ $CH_3COCH_2CH_2OSO_3NH_4$ | H | H | $CH_3CO-$ | $-OSO_3NH_4$ |
| 3........ $(CH_3COCH_2CH_2NC_5H_5)Cl^-$ | H | H | $CH_3CO-$ | $(-NC_5H_5)Cl^-$ |
| 4........ $HOCOCHCH_2SSO_3Na$ $\quad\quad\;\;|$ $\quad\quad\;\;CH_3$ | $CH_3$ | H | $-COOH$ | $-SSO_3Na$ |

TABLE I — Continued

| Compound | $R_1$ | $R_2$ | X | Y |
|---|---|---|---|---|
| 5........ NC—CH₂—CH—CN<br>                            \|<br>                            SO₃Na | H | —CN | —CN | —SO₃Na |
| 6........ C₂H₅(CF₃CH₂CH₂NC₅H₅)Cl⁻ | H | H | C₂H₅CF₃— | (—NC₅H₅)Cl⁻ |
| 7........ (CF₃CH₂CH₂NC₅H₅)Cl⁻ | H | H | CF₃— | (—NC₅H₅)Cl⁻ |
| 8........ (HOCH₂COCH₂CH₂NC₅H₅)Cl⁻ | H | H | HOCH₂CO— | (—NC₅H₅)Cl⁻ |
| 9........ C₆H₅COCH—CH₂OSO₃K<br>                          \|<br>                          CH₃ | CH₃ | H | C₆H₅CO— | —OSO₃K |
| 10....... C₁₁H₂₃COCH₂CH₂SSO₃Na | H | H | C₁₁H₂₃CO— | —SSO₃Na |
| 11....... ClC₆H₄COCH₂CH₂OSOCH₃ | H | H | ClC₆H₄CO— | —OCOCH₃ |

In Table 1 above, compounds 5 and 7 are such that "X" represents the electronegative activating radical.

In the activated reactants described in detail thus far, the splitting-out of HY from a reactant was occasioned by the presence of one activating radical which operates a single ethylenic residue. In other words, the splitting-out of HY from a reactant was occasioned by the presence of an activating radical connected to the alpha carbon of the ethylenic residue. With the ketone-activated reactants, for example, it is possible to provide a structure in which a single carbonyl radical will serve to activate two ethylenic residues. In this manner, two reactive sites are provided in a single molecule. The reaction of active hydorgen-containing polymeric material with such a bifunctional compound results in cross-linking between polymeric molecules. Thus, the bifunctional compounds of this invention can be used for cross-linking cellulosic fabrics, for example, to impart resilience and dimensional stability. As will be shown by examples set forth hereafter, cross-linked polymers made in accordance with the present invention exhibit surprisingly good stability to hydrolysis in both acidic and alkaline media.

A formula for ketone-activated reactants of the present invention in which one carbonyl radical activates two ethylenic residues is as follows:

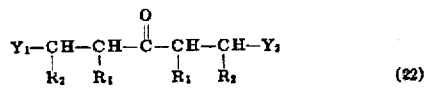

(22)

In addition to the ketone compounds, radicals such as —CY₂— may also be used to provide bifunctional structures. A generic formula for such compounds is as follows:

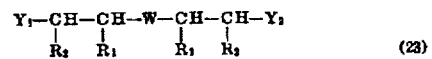

(23)

It is to be appreciated that formula (22) may also be written as follows:

$$X\text{—}CH\text{—}CH\text{—}Y$$
$$\phantom{X\text{—}}R_1\phantom{\text{—}CH\text{—}}R_2$$

(24)

with "X" being substituted for the organic structure:

Examples of the use of activated compounds which provide bifunctional structures of the type shown in formula 23 are set forth below.

EXAMPLE 28

2-Methoxyethyl-2'-Sodium thiosulfatoethyl ketone (CH₃OCH₂CH₂COCH₂CH₂SSO₃Na)

Sodium thiosulfate pentahydrate (19.6 g.) was dissolved in water (100 ml.). To this solution 2-methoxyethyl vinyl ketone (9.0 g.) was added dropwise over 1½ hours. Glacial acetic acid (4.8 g.) was added throughout the addition as necessary to maintain the solution pH between 7 and 8. At the termination of the reaction the pH was adjusted with acetic acid to 6.8. Analysis of the resulting solution for free and bound thiosulfate radicals showed a 99 percent yield of 2 methoxyethyl-2'-sodium thiosulfato-ethyl ketone.

EXAMPLE 29

2-Methoxyethyl-2'-Acetoxyethyl Ketone (CH₃OCH₂CH₂COCH₂CH₂OCOCH₃)

Bis-(2-methoxyethyl) ketone (100 g.) was combined with glacial acetic acid (150 g.), acetic anhydride (105 g.) and sodium acetate (10 g.). The solution was heated at 114°–118° C. for 6 hours, while a distillate of methyl acetate (45 g.) was collected. The undistilled portion was poured into water, neutralized with sodium bicarbonate to pH 6.6 and extracted with chloroform.

Fractional distillation of the extract gave several fractions (total weight 27 g.), b.p. 72°–84° C, at 0.4–0.7 mm. which were redistilled to give the desired product (12 g.), b.p. 90°–92° C. at 1 mm. Examination of this product by gas-liquid chromatography indicated 85 percent purity as 2-methoxyethyl-2'-acetoxyethyl ketone, the major contaminant being 2-acetoxyethyl vinyl ketone.

EXAMPLE 30

Reaction of Cellulose with 2-methoxyethyl-2' acetoxyethyl ketone.

Example 24 was repeated but the product of Example 29 was applied to cotton fabric from a dioxane-water solution in the initial padding. After padding with aqueous NaOH solution saturated with NaCl as described in Example 27, the reaction time was varied between 1 and 30 minutes. The following results were obtained, varying the concentration of reagent and NaOH (expressed as grams per 100 grams of fabric).

| Sample | % Reagent | % NaOH | NaOH equiv. Reagent Equiv. | Reaction Time | % Wt. Gain | % Yield |
|---|---|---|---|---|---|---|
| A1 | 12.3 | 2.94 | 1.0 | 1(min.) | 2.3 | 29 |
| A2 | 11.5 | 3.18 | 1.2 | 30 min. | 3.2 | 43 |
| B1 | 11.5 | 6.78 | 2.6 | 1 min. | 2.6 | 34 |
| B2 | 11.5 | 6.60 | 2.5 | 30 min. | 4.3 | 57 |

Analytical data for the treated samples (given below) indicate that the desired product corresponding to the formula CellOCH₂CH₂COCH₂CH₂OCH₃ was obtained:

| Sample | % COCalcd. Found | % OCH₃ Found | Calcd. |
|---|---|---|---|
| A2 | 0.59 0.76 | 0.63 | 0.84 |
| B2 | 0.47 1.05 | 0.85 | 1.13 |

EXAMPLE 31

Reaction of Cellulose with 2-methoxyethyl-thiosulfato-ethyl-ketone

Example 24 was repeated but the product of Example 28 was applied to cotton fabric from aqueous solution in the initial padding. After padding with aqueous NaOH solution saturated with NaCl, the samples were allowed to stand at room temperature for 10 and for 30 minutes. The following results were obtained when 33 grams of reagent per 100 grams of fabric and 8 grams of NaOH per 100 grams of fabric (equivalent ratio NaOH/reagent 1.5) were deposited in the treatment.

| Sample | Reaction time | % wt. gain | % yield | % CO found | calcd. from w.g. | OCH₃ found | Calcd. from w.g. |
|---|---|---|---|---|---|---|---|
| A1 | 10' | 5.8 | 38 | 0.63 | 1.35 | 0.98 | 1.48 |
| A2 | 30' | 8.3 | 54 | 0.72 | 1.90 | — | — |

The A1 sample prepared in this experiment was padded with aqueous solutions of alkaline catalysts framed and cured for 5 minutes at 150° C. and 178° C. in a forced draft oven. The cured samples were rinsed with 1 percent acetic acid solution, washed thoroughly in dilute non-ionic detergent solution at 40°–45° C. Then the samples were framed and dried.

The crease recovery was increased by this aftertreatment as shown below.

| Catalyst | Curing Temp. °C. | % CO | Crease recov. dry | (W+P) Wet |
|---|---|---|---|---|
| none | before curing | 0.63 | 167 | 189 |
| 3% KHCO₃ | 150 | 0.57 | 196 | 221 |
| 3% K₂CO₃ | 150 | 0.46 | 191 | 216 |
| 3% KHCO₃ | 178 | 0.49 | 194 | 210 |
| 3% K₂CO₃ | 178 | 0.47 | 209 | 224 |

EXAMPLE 32

Bis- (2-sodium thiosulfatoethyl) ketone (NaO₃SSCH₂CH₂COCH₂CH₂SSO₃Na)

Sodium thiosulfate pentahydrate (40.8 g.) was dissolved in water (100 ml.) and combined with a solution of bis-(2-chloroethyl) ketone (63.5 g.) dissolved in ethanol (50 ml). The solution was heated under reflux for 2 hours at which time an analysis for free thiosulfate ion indicated 93 percent conversion to bound thiosulfate. The solution was cooled and evaporated in vacuum to a final weight of 105 g. Analysis of this solution for free and total thiosulfate radicals indicated a 76 percent yield of bis-(2-sodium thiosulfatoethyl) ketone.

EXAMPLE 33

Bis (2 pyridiniummethyl) ketone dichloride [(C₅H₅NCH₂CH₂OCH₂CH₂NC₅H₅) 2Cl⁻]

Bis (2-chloroethyl) ketone (95 g.) was dissolved in ethanol (200 ml.) and treated with pyridine (107 g., 10 percent excess). The mixture was stirred for three hours at room temperature, then cooled to 5°C and filtered to give the bis pyridinium salt of bis-(2-chloroethyl) ketone (81 g.) as a hygroscopic, crystalline solid. On standing at 5° for 2 more days, an additional 37 grams was obtained. Analysis of the product by titration with silver nitrate showed 22.4 percent chloride ion (calc. 22.7 percent, purity 98 percent). Analysis of the product by addition of a known excess of sodium hydroxide, followed by back-titration of the unconsumed alkali, gave an equivalent weight of 168 (calc. 156.5, purity 93 percent).

EXAMPLE 34

Bis-(2-Acetoxyethyl) ketone CH₃COOCH₂CH₂COCH₂CH₂cocH₃

Bis-(2-methoxyethyl) ketone (200 g.) was combined with glacial acetic acid (300 g.), acetic anhydride (210 g.) and sodium acetate (20 g.) The solution was heated at 120° C. for 11 hrs. while a distillate (168 g.) of methyl acetate was collected, b.p. 57°–66° C. The undistilled portion was poured into water, neutralized with sodium bicarbonate to pH 6.3. and extracted with chloroform. Fractional distillation of the extract gave a fraction (43 g.) with b.p. 87°–106° at 0.2 mm. with a refractive index at 27° of 1.4391. Analysis of this fraction showed 94 percent purity as bis-(2-acetoxyethyl) ketone.

EXAMPLE 35

Reaction of Cellulose was bis-(2-pyridinum-ethyl) ketone dichloride (product of Example 33)

Samples of 80 × 80 print cloth were impregnated with aqueous solutions of the product of Example 33 of various concentrations, using a laboratory padder. The fabric samples so treated were framed and dried in a forced draft oven at 60° C, then treated with aqueous NaOH solutions saturated with NaCl. After the second padding the samples were held flat for 1 minute, then rinsed in succession with 1 percent acetic acid solution, water, acetone, then washed thoroughly in dilute non ionic detergent solution at 45°–50° C. The samples were framed and dried.

The following results were obtained with varying percent concentrations of reagent and NaOH (expressed as grams deposited per 100 grams of cotton fabric).

| Sample | % reagent | % NaOH | equiv. NaOH equiv. reagent | found* | % weight gain calculated |
|---|---|---|---|---|---|
| A | 36 | 12 | 1.30 | 8.7 | 9.4 |
| B | 26.2 | 9.2 | 1.37 | 7.3 | 6.9 |
| C | 22.7 | 8.4 | 1.45 | 6.2 | 6.0 |
| D | 16.7 | 6.7 | 1.57 | 4.7 | 4.4 |

*Corrected for changes in moisture regain.

The properties of the treated samples were as follows:

| Sample | %CO found | calcd. from w.g. | crease recov. dry | crease recov. wet | tear str. warp | tens. str. warp | % shrinkage after 10L warp | % shrinkage after 10L filling |
|---|---|---|---|---|---|---|---|---|
| A | 1.6 | 2.7 | 218 | 259 | 0.9 | 38 | 1.5 | 2.5 |
| B | 1.3 | 2.3 | 221 | 262 | 0.9 | 39 | 1.5 | 2.0 |
| C | 1.2 | 2.0 | 225 | 267 | 1.0 | 38 | 1.5 | 2.0 |
| D | 1.0 | 1.6 | 213 | 258 | 1.1 | 39 | 1.5 | 2.5 |

| Untr. Control | 184 | 148 | 1.5 | 55 | 7.0 | 4.5 |

The treated samples exhibited greatly improved crease recovery and dimensional stability, with only moderate losses in tensile and tear strength.

EXAMPLE 36

Reaction of Cellulose with bis-(2-sodium thiosulfatoethyl) ketone (product of Example 32)

Example 35 was repeated, using the aqueous solution of the product of Example 32 in place of the product of Example 33 for the initial fabric treatment. The following results were obtained in this experiment with varying concentrations of reagent and of NaOH (expressed as grams deposited per 100 grams of fabric).

| Sample | % reagent | % NaOH | equiv. NaOH equiv. reagent | found* | % weight gain calculated |
|---|---|---|---|---|---|
| A | 30.4 | 8.2 | 1.2 | 7.8 | 7.0 |
| B | 25.4 | 7.6 | 1.32 | 6.5 | 5.9 |
| C | 19.5 | 6.3 | 1.43 | 5.1 | 4.5 |
| D | 14.2 | 4.7 | 1.46 | 2.6 | 3.3 |

*Corrected for changes in moisture regain.

The properties of the treated samples were as follows:

| Sample | % CO found | calcd. from w.g. | crease recovery (W + F) dry | wet | tensile strength warp |
|---|---|---|---|---|---|
| A | 1.33 | 2.4 | 222 | 273 | 35 |
| B | 1.13 | 2.1 | 209 | 265 | 37 |
| C | 1.07 | 1.7 | 198 | 238 | 36 |
| D | 0.62 | 0.9 | 202 | 244 | 37 |
| Untreated Control | | | 184 | 148 | 55 |

EXAMPLE 37

Reaction of Cellulose with bis (2-acetoxyethyl) ketone (product of Example 34)

Example 35 was repeated but in place of an aqueous solution of the product of Example 33, a dioxane-water solution of the product of Example 34 was used for the initial treatment. The following results were obtained with varying concentration of reagent and base.

| Sample | % reagent | % NaOH | equiv. NaOH equiv. reagent | found* | weight gain calculated |
|---|---|---|---|---|---|
| A | 13.3 | 11.6 | 2.2 | 6.4 | 5.4 |
| B | 14.1 | 8.8 | 1.6 | 6.8 | 5.7 |
| C | 14.2 | 6.0 | 1.1 | 6.5 | 5.7 |

*Corrected for changes in moisture regain.

The treated samples had the following properties:

| Sample | % CO found | calcd. from w.g. | crease recov. (W + F) dry | wet | tensile strength warp |
|---|---|---|---|---|---|
| A | 1.0 | 2.05 | 213 | 251 | 42 |
| B | 1.23 | 2.16 | 218 | 260 | 38 |
| C | 1.21 | 2.10 | 223 | 255 | 36 |
| Untreated Control | | | 184 | 148 | 55 |

EXAMPLE 38

Acid and Alkaline Hydrolysis of Cross-linked Cotton samples Cross-linked with Bifunctional ketones 80 × 80 cotton samples cross-linked with bis (2-pyridiniumethyl) ketone dichloride according to the procedure described in Example 35 and with bis (2-sodiumthiosulfatoethyl) ketone according to the procedure described in Example 36 were exposed to hydrolytic solutions under acidic and alkaline conditions.

Acid hydrolysis was carried out at 80° C. for 30 minutes in a 1.5% $H_3PO_4$ solution containing 5 percent urea (liquor-fabric ratio 50:1).

The following results were obtained:

| Sample C from | % CO Before Hydrolysis | After Hydrolysis | wet crease recov. (W + F) Before Hydrolysis | After Hydrolysis |
|---|---|---|---|---|
| Example 36 | — | — | 238 | 232 |
| Sample C from Example 35 | 1.2 | 1.1 | 267 | 262 |

It is apparent that the fabric properties were essentially unchanged after acid hydrolysis.

The alkaline hydrolysis was carried out at 65° C. for 60 minutes in a 0.5N NaOH solution. (Liquor-fabric ratio 50:1). The following results were obtained.

| Sample C from | % loss of wt. after hydrolysis | % CO before hydrolysis | after hydrolysis | wet crease recov. before hydrolysis | after hydrolysis |
|---|---|---|---|---|---|
| Example 36 | 0.9 | — | — | 238 | 234 |
| Example 35 | 0.4 | 1.2 | 0.74 | 267 | 266 |

It is apparent that even under conditions of drastic alkaline hydrolysis cross-links formed as described for example in Examples 35 and 36 are exceedingly stable.

EXAMPLE 39

44.0 g. of a 10 percent aqueous solution of medium viscosity polyvinylalcohol (Elvanol 71-24, product of E. I. duPont deNemours & Co., Inc.) are mixed with 15.6 g. of the bis pyridinium salt of divinyl ketone (product of Example 33) at room temperature. A clear solution is obtained. When 24.0 grams of 25 percent aqueous NaOH solution are added, an insoluble gel precipitates out, which is filtered, neutralized with dilute acetic acid, washed thoroughly with water and dried in vacuum oven at 60°–70° C. Weight of the product obtained: 8.3 g. CO content: 7.0 percent.

The modified polyvinyl alcohol is tested for water resistance. 1 g. sample is boiled in 25 ml of water for 5 minutes, filtered, dried, weighted. No weight loss was measured, proving the excellent water resistance of the product obtained.

EXAMPLE 40

25.0 grams of corn starch (Argo Corn Starch, manufactured by Best Foods) are stirred with 33 ml. of water at room temperature and then 1.8 grams of divinyl ketone bis pyridinium salt (product of Example 33) are added. When a homogenous slurry is obtained, 22.5 g. of 3 percent aqueous NaOH solution are added. After stirring the mixture for 1 minute, it is allowed to stand at room temperature for 1 hour. The solid which settled out is filtered, neutralized with dilute acetic acid, washed thoroughly with water and dried in vacuum oven at 60°–70° C. Weight of the product: 23.1 g. CO content: 0.5 percent.

A test portion of the solid product (1 gram) is suspended in 10 ml. of water and the water is brought to boil. The modified starch product swells only very slightly and settles out on standing, while the unmodified starch forms a smooth viscous paste when tested by the same procedure.

EXAMPLE 41

When the procedure of Example 40 is repeated, using 8.3 grams of the ketone of Example 33 and 22.5 g. of 14 percent aqueous NaOH solution, 28.0 g. of the dried product are obtained. CO content: 1.3 percent. The properties of the modified corn starch are identical to those of the product of Example 40.

A very important class of compounds, not represented by formula (23), in which the activating radical provides two reactive sites has the following generic formula:

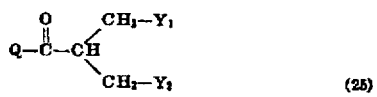
(25)

Formula (25) can be written using the X notation as follows:

$$X-CH-CH-Y$$
$$\phantom{X-}R_1\phantom{-CH-}R_2$$

where X is

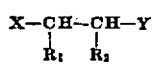

$R_1$ is $CH_2$—Y and $R_2$ is H.

The examples below illustrate this aspect of the invention.

EXAMPLE 42

Bis-($\alpha$,$\alpha$-acetoxy methyl) acetone

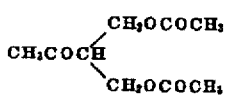

118 g. (1.01 mol) of anhydrous $\alpha$,$\alpha$-dimethylol acetone and 255 g. (2.5 mol) of acetic anhydride were dissolved in 900 g. of ethyl acetate. Conc. $H_2SO_4$ was added to this solution dropwise, until the reaction started to be exothermic. The temperature increased to 50° C without external heating. After the exotherm subsided, the reaction mixture was heated to 80° C. for 2 hours. The reaction mixture was then cooled and poured into 2,000 g. crushed ice. The organic phase was separated. The aqueous phase was extracted several times with ethylacetate and the extracts were combined with the organic phase. The combined organic phase was dried over anhydrous $Na_2SO_4$, filtered and stripped under vacuo. After standing overnight in refrigerator, a crystalline solid (34.g.) was obtained from the residue on filtration. M. P.: 81°–82°C.

Latent vinyl content: 24.5 percent (calcd. 26.7 percent). By distilling the filtrate, 19 g. of distillate was obtained, which solidified in the recovering flask. B.P.: 150°–154° C. at 0.3–0.4 mm. Latent vinyl content: 24.9 percent (calcd. 26.7 percent). Total yield of purified product: 26 percent.

EXAMPLE 43

Reaction of cellulose with bis ($\alpha$,$\alpha$-acetoxy-methyl) acetone (product of Example 42)

Example 35 was repeated, but in place of an aqueous solution of the product of Example 33, a dioxane solution of the product of Example 42 was used for the initial treatment. The following results were obtained by varying reaction conditions.

| Sample | % Reagent OWP | % NaOH | NaOH Equiv. Rang. Equiv. | reaction Conditions | % W.G. Found | calcd. |
|---|---|---|---|---|---|---|
| A | 26.4 | 10.4 | 1.0 | RT,wet,1/2 hour | 3.5 | 10.7 |
| B | 26.4 | 10.4 | 1.0 | RT,wet, 3 hours | 5.0 | 10.7 |
| C | 26.4 | 11.0 | 1.05 | RT,wet,24 hours | 7.3 | 10.7 |
| D | 25.8 | 18.2 | 1.78 | RT,wet, 3 hours | 7.0 | 10.4 |
| E | 24.9 | 13.2 | 1.34 | steaming, 5 min. | 10 | 10.1 |

*Corrected for changes in moisture regain.

The properties of the treated samples were as follows:

| Sample | % Carbonyl found | calcd. fr.w.g. | % loss of added weight after 3 hrs. extraction in boiling MEK | (W + F) dry | wet |
|---|---|---|---|---|---|
| A | — | — | — | 200 | 224 |
| B | 0.67 | 1.6 | — | 184 | 221 |
| C | — | — | — | 194 | 228 |
| D | 0.82 | 2.2 | None | 187 | 221 |
| E | — | — | — | 156 | 235 |

In addition to the above, the following compounds are typical of those defined by formula (25):

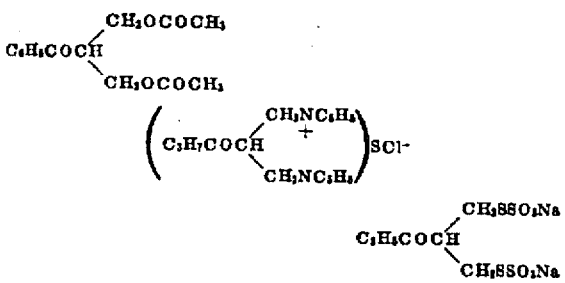

Where the activating radical is divalent, it is possible to synthesize compounds of the type contemplated by this invention which contain the activating group as an integral part of the compound. Accordingly, it is possible to provide compounds in which a plurality of activating groups are present, each of which activates a different leaving group. A typical compound of this classs has the following formula:

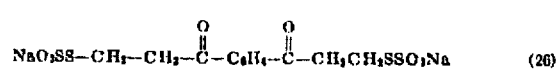
(26)

In compound (26), there are two carbonyl activating groups, each of which activates a separate leaving group.

Compounds of the type shown in formula (26) may be represented by the following formula:

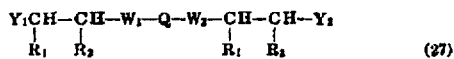

$$\begin{matrix} Y_1CH-CH-W_1-Q-W_2-CH-CH-Y_2 \\ | \quad | \quad\quad\quad\quad | \quad | \\ R_1 \quad R_2 \quad\quad\quad\quad R_1 \quad R_2 \end{matrix} \quad (27)$$

Using the X notation, the compound of formula (26) may be generically written as follows:

$$\begin{matrix} X-CH-CH-Y \\ | \quad | \\ R_1 \quad R_2 \end{matrix} \quad (28)$$

where X is

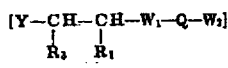

$$[Y-CH-CH-W_1-Q-W_2] \\ \quad | \quad | \\ \quad R_2 \quad R_1$$

In addition to the carbonyl activating radical, the amide structure can also be used in compounds of the type defined by generic formula (27). A typical compound is as follows:

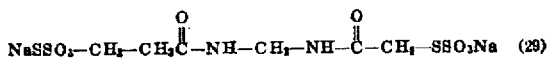

$$NaSO_3-CH_2-CH_2\overset{O}{\overset{\|}{C}}-NH-CH_2-NH-\overset{O}{\overset{\|}{C}}-CH_2-SSO_3Na \quad (29)$$

Example 10 above embodies two carboxylic activating radicals, each of which activates a separate leading group Other examples describing compounds of this type are set forth below.

EXAMPLE 44

Dodeca-1, 12-dipyridinium-3,9-dione-dichloride [$(C_5H_5NCH_2CH_2CO(CH_2)_6COCH_2CH_2NC_5H_5) 2Cl^-$]

Dodeca-1, 12-dichloro-3, 9 dione (0.3 m.) was heated with pyridine (85 g., 1.07 m.) in ethanol at 80° C., for 12 hours. The crude product was precipitated by the addition of 500 ml. acetone. The precipitated product was recrystallized from an ethanol-acetone-ether mixture. A water-soluble solid was obtained.

Equivalent weight by saponification: 248; calculated: 212.

Chloride content: 14.8 percent; calculated: 16.8 percent.

EXAMPLE 45

Tetradeca-1, 14-dipyridinium-3,9 -dione-dichloride [$(C_5H_5NCH_2CH_2CO(CH_2)_8COCH_2CH_2NC_5H_5) 2Cl^-$]

Tetradeca-1,14-dichloro-3,9-dione (100 g., 0.399 m.) was treated with pyridine (99 g., 1.24 m.) in ethanol at 80° C., for 10 hours.

The major portion of the solvent and excess pyridine was removed in vacuo. The crude product was precipitated by the addition of acetone and recrystallized from an ethanol-ether solvent mixture. A water-soluble solid was obtained.

Equivalent weight by saponification: 280; calculated: 227.5.

Chloride content: 12.6 percent; calculated: 15.6 percent.

EXAMPLE 46

Reaction of cellulose with dodeca 1, 12 dipyridinium-3,9-dione-dichloride (product of Example 44)

Example 35 was repeated, but in place of an aqueous solution of the product of Example 33, an aqueous solution of the product of Example 44 was used for the initial treatment. The following results were obtained by varying reaction conditions:

| Sample | % Reagent OWF | % NaOH OWF | equiv. NaOH equiv. reag. | reaction time RT | % Yield | % CO found | calcd. |
|---|---|---|---|---|---|---|---|
| A | 27.9 | 5.2 | 1.0 | ½ hours | — | 2.8 | 2.9 |
| B | 27.9 | 5.2 | 1.0 | 3 hours | 100 | 2.5 | 2.9 |
| C | 27.9 | 8.3 | 1.57 | ½ hours | 100 | 2.6 | 2.9 |

The properties of the treated samples were as follows:

| Sample | % Loss of added weight after 2 Hrs. extraction in boiling MEK | crease recovery (W+F) Dry | Wet |
|---|---|---|---|
| A | 23.5 | 197 | 227 |
| B | 11 | 253 | 260 |
| C | 12 | 212 | 242 |

EXAMPLE 47

Reaction of cellulose with Tetradeca 1, 14-dipyridinium-3,9-dione dichloride (product of Example 45)

Example 35 was repeated using an aqueous solution of the product of Example 45 in place of the product of Example 33 for the initial treatment. The following results were obtained by varying reaction conditions.

| Sample | % Reagent OWF | % NaOH | equiv. NaOH equiv. reag. | Reaction time RT of reac. | % yield | % CO found | calcd. |
|---|---|---|---|---|---|---|---|
| A | 21.2 | 4.37 | 1.11 | ½ hour | 92 | 2.1 | 2.3 |
| B | 21.5 | 4.23 | 1.11 | 3 hours | 100 | — | |
| C | 21.2 | 4.0 | 1.07 | 24 hours | 100 | 2.3 | 2.3 |
| D | 21.8 | 5.7 | 1.48 | ½ hour | 100 | — | — |
| E | 21.8 | 5.9 | 1.53 | 3 hours | 100 | — | — |

Properties of the treated samples were as follows:

| Sample | % loss of added weight after 3 hrs. Extraction in boiling MEK | (W+F) crease recovery Dry | Wet |
|---|---|---|---|
| A | 34 | 179 | 220 |
| B | — | 190 | 242 |
| C | 16 | 193 | 229 |
| D | — | 185 | 231 |
| E | — | 168 | 237 |

In the activated reactants contemplated by the present invention, $R_1$ and $R_2$ are preferably hydrogen since this will avoid any steric hindrance problems and will generally provide the most reactive compounds. If the activating radical is particularly effective, such as a carbonyl group, then $R_1$ and $R_2$ can be more complex radicals without detracting from the advantages of the invention.

As can be seen from a study of the activated reactants, the activating radical is always attached to the alpha carbon of the ethylenic group through a carbon-to-carbon linkage. In other words, the activating radical must contain a terminal carbon atom by which it is connected to the ethylenic radical.

In treating active hydrogen-containing polymers with activated compounds of the type contemplated by the present invention, it is preferable to divide the treatment into two separate steps. Thus, for example, in the first step, the polymer may be treated with the activated compound, and the treated polymer then contacted with an alkaline or basic medium. In this manner, the splitting-out of the HY occurs at a time when the activated reactant is in contact with the polymer. Alternatively, the polymer may be treated first with a basic or alkaline material and then subsequently exposed to the activated compound.

The choice of a solvent for treatment of active hydrogen-containing polymers in accordance with the present invention is not critical. Water is generally preferred because it is non-toxic and readily available. In addition, many of the more common alkaline-producing compounds are water-soluble.

Suitable alkaline compounds for use in processes of the present invention include alkali metal phosphates, carbonates, hydroxides, alkoxides and silicates; and quaternary ammonium hydroxides. Generally, compounds which are strong bases may be used; it being desirable that the alkaline reagent produce a pH above about 8 in a one-normal solution of water. Use of higher pH will provide an increase in the rate or reaction. Of course, care must be taken not to use a pH which will have an undesirable effect on the particular polymer being treated.

The connection of the activated compound may be varied within wide limits, depending on the structure of the polymer and the compound; and also depending on the amount of reaction desired. Good results are obtained with reactant-to-polymer proportions in the range of about 5 to 50 percent, by weight. The amount of alkaline compound preferably should be at least equivalent to the amount of activated compound used.

The time and temperature of the reaction are variables which may be selected by one skilled in the art, and depend upon the concentrations used and the structure of the polymer and of the activated compound. The reaction period may vary from a few seconds to a few minutes at temperatures up to 100° C. Of course, increased temperature provide accelerated reaction rates.

The active hydrogen-containing polymers which may be used in conjunction with the present invention have been described above from the standpoint of chemical structure. With respect to the physical characteristics or physical form of the polymers: there is a wide choice. Thus, the active hydrogen-containing polymers may be in the form of a solution, dispersion and the like. Alternatively, the polymer may be of the fiber-forming type and may be treated as a fiber, yarn, woven or other type of fabric, web, mat and the like. It is advantageous in many instances to utilize a swelling agent during the treatment of a polymer. Thus, for example, the treatment of cellulose polymers of the present invention is desirably conducted in the presence of water.

The properties imparted to the polymers as the result of the processes described herein depend on the structure of the activated reactant and on the substituent group introduced. It is known, for example, that rot resistance, acid resistance and heat resistance can be imparted to cellulose by converting a small number of the available hydroxyl groups to the corresponding cyanoethyl ether grouping as indicated in the following equation:

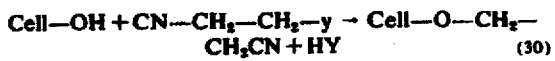

Cell—OH + CN—CH$_2$—CH$_2$—y → Cell—O—CH$_2$—CH$_2$CN + HY    (30)

The preparation of cyanoethyl ethers of cellulose by the methods of the present invention does not require the use of acrylonitrile which is a highly toxic and volatile compounds; and can be carried out in open convention commercial equipment, using aqueous solutions. The yields of cyanoethylated polymer are good, no provisions are necessary for the recovery and purification of reagents, and the formation of by-products is minimized.

The introduction of cyanoethyl groups into soluble polymers such as starch and polyvinyl alcohol can be similarly achieved, the water sensitivity of the polymer can be decreased by the presence of the hydrophobic substituents (—OCH$_2$CH$_2$CN) and the resistance to mildew can be enhanced by the modification.

If, on the other hand, it is desired to increase the water solubility of an insoluble polymer, carboxyethyl groups can be introduced by the processes of the present invention. The preparation of polymers having valuable ion exchange properties by modification with suitable reagents is also possible. In face, new functional groups can be introduced into polymers as desired, and many novel polymers having useful properties can thus by synthesized.

It is to be understood that the various examples and illustrative embodiments described above are intended to exemplify the present invention and variations can be made by one skilled in the art without departing from the spirit and scope of the invention.

What is claimed is:

1. A compound having the formula:

$$CH_3OCH_2CH_2\overset{O}{\underset{\|}{C}}CH_2CH_2SSO_3Na$$

2. A compound having the formula:

$$CH_3CH=CH\overset{O}{\underset{\|}{C}}CH_2CH_2SSO_3Na$$

* * * * *